United States Patent
Chaffey

(10) Patent No.: US 12,425,810 B2
(45) Date of Patent: Sep. 23, 2025

(54) METHOD FOR DETERMINING PROXIMITY BETWEEN MOBILE DEVICES, METHOD FOR MANAGING A DATABASE, COMPUTER PROGRAM PRODUCT, AND MOBILE DEVICE

(71) Applicant: NEARFACES UG, Munich (DE)

(72) Inventor: Paul Chaffey, Munich (DE)

(73) Assignee: NEARFACES UG, Munich (DE)

( * ) Notice: Subject to any disclaimer, the term of this patent is extended or adjusted under 35 U.S.C. 154(b) by 0 days.

(21) Appl. No.: 18/867,837

(22) PCT Filed: May 22, 2023

(86) PCT No.: PCT/EP2023/063663
§ 371 (c)(1),
(2) Date: Nov. 21, 2024

(87) PCT Pub. No.: WO2023/227534
PCT Pub. Date: Nov. 30, 2023

(65) Prior Publication Data
US 2025/0150785 A1    May 8, 2025

(30) Foreign Application Priority Data
May 23, 2022 (EP) .................... 22174886

(51) Int. Cl.
*H04W 4/00* (2018.01)
*H04L 61/45* (2022.01)
*H04L 61/4594* (2022.01)
*H04W 4/029* (2018.01)
(Continued)

(52) U.S. Cl.
CPC ......... *H04W 4/029* (2018.02); *H04L 61/4547* (2022.05); *H04L 61/4594* (2022.05); *H04W 8/005* (2013.01); *H04W 76/14* (2018.02)

(58) Field of Classification Search
CPC ..... H04W 4/029; H04W 76/14; H04W 8/005; H04L 61/4547; H04L 61/4594
See application file for complete search history.

(56) References Cited

U.S. PATENT DOCUMENTS

| | | | |
|---|---|---|---|
| 9,674,670 B2* | 6/2017 | Berentsen | H04W 76/14 |
| 2007/0030824 A1* | 2/2007 | Ribaudo | H04L 51/52 |
| | | | 370/328 |

(Continued)

FOREIGN PATENT DOCUMENTS

WO    WO 02/062091 A1    8/2002

OTHER PUBLICATIONS

European Search Report for Application No. 22174886.6 dated Oct. 14, 2022.
(Continued)

*Primary Examiner* — Erika A Washington
(74) *Attorney, Agent, or Firm* — Moser Taboada

(57) ABSTRACT

A method for determining proximity between a first mobile device (111) of a first user (121) and a second mobile device (112) of a second user (122) is provided. The method includes: searching, by the second mobile device (112), for short-range advertising broadcasts sent by mobile devices (111, 113) of other users (121, 123); receiving, by the second mobile device (112), among the short-range advertising broadcasts at least a first short-range advertising broadcast sent by the first mobile device (111), the first short-range advertising broadcast encoding a universally unique identifier (UUID) and a first user identifier being unique for the first user (121) of the first mobile device (111); decoding, by the second mobile device (112), the first short-range advertising broadcast received from the first mobile device (111) to obtain the first user identifier; checking, by the second mobile device (112), whether a received from the first mobile device (111) pairing entry in a local database stored (Continued)

in the second mobile device (112) exists for the first user identifier, and if the pairing entry exists, initiating, by the second mobile device (112), a user notification process to notify, by the second mobile device (112), the second user (122) that the first user (121) is located in proximity.

15 Claims, 12 Drawing Sheets

(51) Int. Cl.
  *H04W 8/00* (2009.01)
  *H04W 76/14* (2018.01)

(56) References Cited

U.S. PATENT DOCUMENTS

| | | |
|---|---|---|
| 2007/0124721 A1 | 5/2007 | Cowing et al. |
| 2007/0293193 A1* | 12/2007 | Ramsten ........... H04M 1/72412 |
| | | 455/411 |
| 2013/0079037 A1 | 3/2013 | Dobyns |
| 2015/0171926 A1 | 6/2015 | Coelho et al. |
| 2015/0234832 A1 | 8/2015 | Gardner, III et al. |
| 2016/0234641 A1* | 8/2016 | Todasco .............. H04L 61/4594 |
| 2020/0396565 A1 | 12/2020 | Moldavsky et al. |

OTHER PUBLICATIONS

International Search Report and Written Opinion for PCT/EP2023/063663 dated Sep. 20, 2023.
Ferreira R. et al., Recognizing Entities Across Protocols with Unified UUID Discovery and Asymmetric Keys, Globecom 2013—Symposium on Selected Areas in Communications, Dec. 9, 2013, pp. 2902-2908, DOI: 10.1109/GLOCOM.2013.6831515.

* cited by examiner

| Database ID | Install Date /Time | Email Address | Users Name | Status | Phone Number | Profile Pic |
|---|---|---|---|---|---|---|
| 1 | 10.03.2016 15:12:36 | john.smith@gmail.com | John Smith | Hi from John | 491746XXXXXX |  |
| 2 | 12.01.2022 17:00:12 | | Jim Smith | Love Life | 441600XXXXXX |  |
| 3 | 13.01.2022 14:22:05 | | Jane | Best singer in the World | 49173XXXXXX |  |
| 23 | 07.05.2022 9:23:15 | janet.smith@yahoo.com | Janet Smith | In Munich | 49173XXXXXX |  |
| 8564 | 13.01.2022 14:22:05 | | John Doe | Nothing | 49176XXXXXX |  |
| 23456 | 07.05.2022 9:23:15 | | Jim Doe | Always happy | 49178XXXXXX |  |
| | | | | )py | 49176XXXXXX |  |
Fig. 5

| User ID | Paired | Disallow | Block |
|---------|--------|----------|-------|
| 2 | ✓ | ☐ | ☐ |
| 3 | ✓ | ☐ | ☐ |
| 23 | ✓ | ✓ | ☐ |
| 8564 | ✓ | ☐ | ✓ |
| 23456 | ✓ | ☐ | ☐ |
| 32768 | ☐ | ☐ | ☐ |

Fig. 8

| Database ID | Email Address | Users Name | Status | Phone Number | Disallow | Profile Pic |
|---|---|---|---|---|---|---|
| 2 | | Jim Smith | Love Life | 441600XXXXXX | ☐ | 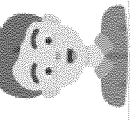 |
| 3 | | Jane | Best singer in the World | 49173XXXXXX | ☐ |  |
| 23 | janet.smith@yahoo.com | Janet Smith | In Munich | 49173XXXXXX | ☑ |  |
| 23456 | | Jim Doe | Always happy | 49178XXXXXX | ☐ |  |
Fig. 9

| User ID | User ID Hit | Location | HIT Date / Time | Hit Length (min) |
|---|---|---|---|---|
| 1 | 646 | Latitude / Longitude | 20.03.2016 15:12:36 | 6 |
| 1 | 737 | Latitude / Longitude | 20.03.2016 15:12:36 | 1 |
| 1 | 343 | Latitude / Longitude | 20.03.2016 15:12:36 | 1 |
| 1 | 77 | Latitude / Longitude | 20.03.2016 15:12:36 | 1 |
| 1 | 927 | Latitude / Longitude | 20.03.2016 15:12:36 | 4 |
| 1 | 889 | Latitude / Longitude | 20.03.2016 15:12:36 | 22 |
| 1 | 388 | Latitude / Longitude | 20.03.2016 15:12:36 | 29 |
| 1 | 38 | Latitude / Longitude | 20.03.2016 15:12:36 | 1 |
| 2 | 242 | Latitude / Longitude | 20.03.2016 15:12:36 | 1 |
| 2 | 302 | Latitude / Longitude | 20.03.2016 15:12:36 | 1 |
| 2 | 160 | Latitude / Longitude | 20.03.2016 15:12:36 | 1 |
| 2 | 512 | Latitude / Longitude | 20.03.2016 15:12:36 | 11 |
| 2 | 253 | Latitude / Longitude | 20.03.2016 15:12:36 | 1 |
| 2 | 576 | Latitude / Longitude | 20.03.2016 15:12:36 | 1 |
| 2 | 502 | Latitude / Longitude | 20.03.2016 15:12:36 | 2 |
| 2 | 668 | Latitude / Longitude | 20.03.2016 15:12:36 | 3 |
| 3 | 494 | Latitude / Longitude | 20.03.2016 15:12:36 | 4 |
| 3 | 693 | Latitude / Longitude | 20.03.2016 15:12:36 | 5 |
| 3 | 351 | Latitude / Longitude | 20.03.2016 15:12:36 | 6 |
| 3 | 687 | Latitude / Longitude | 20.03.2016 15:12:36 | 7 |

Fig. 12

METHOD FOR DETERMINING PROXIMITY BETWEEN MOBILE DEVICES, METHOD FOR MANAGING A DATABASE, COMPUTER PROGRAM PRODUCT, AND MOBILE DEVICE

TECHNICAL FIELD

The present disclosure relates to a method for determining proximity between a first mobile device of a first user and a second mobile device of a second user, particularly to facilitate interpersonal contacts between users which are acquainted with each other. The present disclosure also relates to a method for managing a database. Further aspects relate to a computer program product and to a mobile device.

BACKGROUND

The present disclosure provides methods, systems and applications for mobile devices to notify a user when another user is in proximity.

Proximity based technologies have been used for many purposes including facilitating delivery of marketing information in promoting products and communication between users when they are in close proximity. In many technologies, short-range communication protocols are used for detecting whether a user is within a short physical distance of another device.

For example, US 2015/0234832 A1 discloses a system and method for detecting proximity between users. The system includes a processor and a memory storing instructions which when executed cause the system to: determine a context associated with a first user device; query other user devices based on the context to create a set of other user devices that satisfy a query; generate a list of filtered devices by filtering the set of other user devices; notify the first user device of the list of filtered devices; and query for the list of filtered devices to determine which filtered devices are within proximity to the first user device. The devices scan for the MAC address of other devices.

Near-field technology is used in US 2013/0079037 A1 to facilitate communication and exchange of information during social events based on social networking filters set in advance.

US 2015/0171926 A1 discloses devices for electronically enabled in-person social networking. A device is worn on a first user's wrist or otherwise placed on or near a first user. The device is associated with the user and a user profile is established. When another user wearing or holding a similar device comes in close proximity to the first user, the profiles of the two users are compared to see if any attributes from both users have a strong correlation or match. If so, an indication is displayed on the device, indicating to both users that a match between the two users has been determined.

US 2007/0124721 A1 discloses proximity-aware virtual agents for use with wireless mobile devices to find matches based on predefined characteristics.

US 2020/0396565 A1 discloses a mobile computing device application designed to assist users in performing directed searches within defined geographic scope to achieve specific goals within social, ecommerce and collaborative spaces. An Internet-based server is responsible for coordinating all connections between mobile peers. Peer matches are pre-qualified by the server based on available location-based service (LBS) data and other criteria. Short-range wireless communication protocols are used as a trigger to indicate proximity. Thus, contact between users in close proximity is established without the need for continuous communication between the mobile device and the server.

Commonly known proximity-based technologies are often suffering from insufficient privacy control as, for example, the location of the devices is sent to a central server.

SUMMARY OF THE DISCLOSURE

According to an embodiment of the present disclosure, a method for determining proximity between a first mobile device of a first user and a second mobile device of a second user is provided. The second mobile device searches for short-range advertising broadcasts sent by mobile devices of other users and receives, among the short-range advertising broadcasts, at least a first short-range advertising broadcast sent by the first mobile device. The first short-range advertising broadcast encodes a universally unique identifier (UUID) and a first user identifier being unique for the first user of the first mobile device. The second mobile device decodes and selects the first short-range advertising broadcast, which contains the universally unique identifier, received from the first mobile device to obtain the first user identifier. The second mobile device checks whether a pairing entry in a local database stored in the second mobile device exists for the first user identifier and if the pairing entry exists, the second mobile device initiates a user notification process to notify the second user that the first user is located in proximity. A pairing entry is an entry in the local database containing a user identifier. The location of a user and his/hers mobile device is assumed to be the same for the proximity detection.

According to an embodiment of the present disclosure, which can be combined with other embodiments described herein, the second mobile device periodically searches for the short-range advertising broadcasts.

According to an embodiment of the present disclosure, which can be combined with other embodiments described herein, the method includes broadcasting, by the second mobile device, second short-range advertising broadcasts encoding the universally unique identifier (UUID) and a second user identifier being unique for the second user of the second mobile device.

According to an embodiment of the present disclosure, which can be combined with other embodiments described herein, the second mobile device broadcasts the second short-range advertising broadcast repeatedly after every sending period.

According to an embodiment of the present disclosure, which can be combined with other embodiments described herein, the second mobile device repeatedly enters a listening mode having a given listening duration during which the second mobile device continuously searches for the short-range advertising broadcasts, wherein the listening duration is longer than sending period.

According to an embodiment of the present disclosure, which can be combined with other embodiments described herein, a pairing entry in a local database stored in the first mobile device exists for a second user identifier unique for the second user of the second mobile device. The first mobile device searches for short-range advertising broadcasts sent by mobile devices of other users. The first mobile device receives, among the short-range advertising broadcasts at least the second short-range advertising broadcast sent by the second mobile device. The first mobile device decodes the second short-range advertising broadcast to obtain the second user identifier. The first mobile device checks whether a pairing entry in the local database stored in the first mobile device exists for the second user identifier. If the pairing entry exists, the first mobile device initiates a user notification process to notify, by the first mobile device, the first user that the second user is located in proximity.

According to an embodiment of the present disclosure, which can be combined with other embodiments described herein, the short-range advertising broadcasts are unidirectional advertising broadcasts, particularly unidirectional Bluetooth advertising packets.

According to an embodiment of the present disclosure, which can be combined with other embodiments described herein, the second mobile device receives, among the short-range advertising broadcasts, a third short-range advertising broadcast sent by a third mobile device. The third short-range advertising broadcast encodes the universally unique identifier (UUID) and a third user identifier being unique for a third user of the third mobile device. The second mobile device decodes the third short-range advertising broadcast to obtain the third user identifier and checks whether a pairing entry in a local database stored in the second mobile device exists for the third user identifier. If the pairing entry does not exist, the second mobile device disregards the third short-range advertising broadcast without notifying the second user.

According to an embodiment of the present disclosure, which can be combined with other embodiments described herein, a communication is established between the second mobile device and a central database. The second mobile device enquires whether a user entry for the first user exists in a user table stored in the central database and checks whether an entry for the second user exists in a pairing table of the first user stored in the central database. When an entry for the second user exists in the pairing table of the first user the pairing entry is created in the local database stored in the second mobile device for the first user identifier.

According to an embodiment of the present disclosure, which can be combined with other embodiments described herein, wherein decoding the first short-range advertising broadcast includes obtaining the universally unique identifier (UUID), wherein the first short-range advertising broadcast is disregarded if the universally unique identifier (UUID) does not correspond to a pre-defined universally unique identifier stored in the second mobile device.

According to an embodiment of the present disclosure, which can be combined with other embodiments described herein, wherein a software application is executed on each of the first mobile device and the second mobile device, wherein the respective application executed on the first mobile device and the second mobile device controls each of the first mobile device and the second mobile device to broadcast short-range advertising broadcasts and to search for short-range advertising broadcasts, particularly without requiring user interaction.

According to an embodiment of the present disclosure, which can be combined with other embodiments described herein, wherein an existing pairing entry for the first user in the local database stored in the second mobile device is removed from the local database stored in the second mobile device when the first user marks the second user, using the first mobile device, as being blocked.

According to an embodiment of the present disclosure, which can be combined with other embodiments described herein, the local database stored in the second mobile device is updated by establishing a communication with a remoted central database, wherein updating includes enquiring, by the second mobile device, whether pairing entries have been added to a pairing table of the second user stored in the central database, and if yes, updating the local database.

According to an embodiment of the present disclosure, which can be combined with other embodiments described herein, a computer program product comprises instructions which, when the program is executed by a computer, cause the computer to carry out the method for determining proximity between a first mobile device of a first user and a second mobile device of a second user as disclosed herein.

According to an embodiment of the present disclosure, which can be combined with other embodiments described herein, a data carrier signal carries the computer program product as disclosed herein.

According to an embodiment of the present disclosure, which can be combined with other embodiments described herein, a mobile device includes a display, a network communication interface, a digital memory, and a processor configured to perform the method for determining proximity between a first mobile device of a first user and a second mobile device of a second user as disclosed herein.

According to an embodiment of the present disclosure, which can be combined with other embodiments described herein, a method for managing a database includes hosting, by a server, a central database comprising a plurality of user entries for users, each user entry contains a user identifier for the respective user, contact details of the respective user associated with the user identifier, and a pairing table, receiving, by the central database, contact details of a first new user from a mobile device of the first new user, creating a first user entry in the central database for the first new user, the first user entry containing a first user identifier for the first new user, contact details of the first new user associated with the first user identifier, and first pairing table linked with the first user entry, searching in the central database, upon request of the mobile device of the first new user, for a second user entry containing a second user identifier for the second user, contact details of the second user associated with the second user identifier, and second pairing table linked with the second user entry, adding to the first pairing table a pairing entry for the second user, if the central database contains the second user entry, checking in the second pairing table of the second user if a pairing entry for the first new user exists, if a pairing entry for the first user exists in the second pairing table, mark the pairing entry for the first new user in the second pairing table and the pairing entry for the second user in the first pairing table as being matched, and forwarding to the mobile device of the first new user and optionally to the second user that there is a match between the first new user and the second user, i.e. the matched pairing entries are transmitted.

According to an embodiment of the present disclosure, which can be combined with other embodiments described herein, wherein the mobile device of the first new user searches for the second user entry based on contact details of the second user stored in the mobile device of the first new user.

According to an embodiment of the present disclosure, which can be combined with other embodiments described herein, wherein the central database contains a third user entry containing a third user identifier for a third user, contact details of the third user associated with the third user identifier, and a third pairing table linked with the third user. The method includes: adding, upon request of a mobile device of the third user, a pairing entry for the first new user to the third pairing table; checking, by the central database or upon request of the mobile device of the third user, whether the first pairing table includes a pairing entry for the third user, if a pairing entry for the third user exists in the first pairing table, mark the pairing entry for the first new user in the third pairing table and optional the pairing entry for the third user in the first pairing table as being matched, and forwarding to the mobile device of the third user that there is a match between the first new user and the third user and optionally forwarding to the mobile device of the first new user that there is a match between the first new user and the third user.

According to an embodiment of the present disclosure, which can be combined with other embodiments described herein, a server includes a processor configured to perform the method for managing a database as disclosed herein.

BRIEF DESCRIPTION OF THE DRAWINGS

Illustrative embodiments are described below with reference to the accompanying drawings without being limited thereto.

FIG. 5 shows an exemplary user table stored in a central database.

FIG. 8 shows an exemplary pairing table stored in the central database for an exemplary user.

FIG. 9 shows an exemplary pairing table stored in the local database for the exemplary user.

FIG. 12 is a schematic representation of a history of received notifications.

DETAILED DESCRIPTION OF EMBODIMENTS

Figure 1:
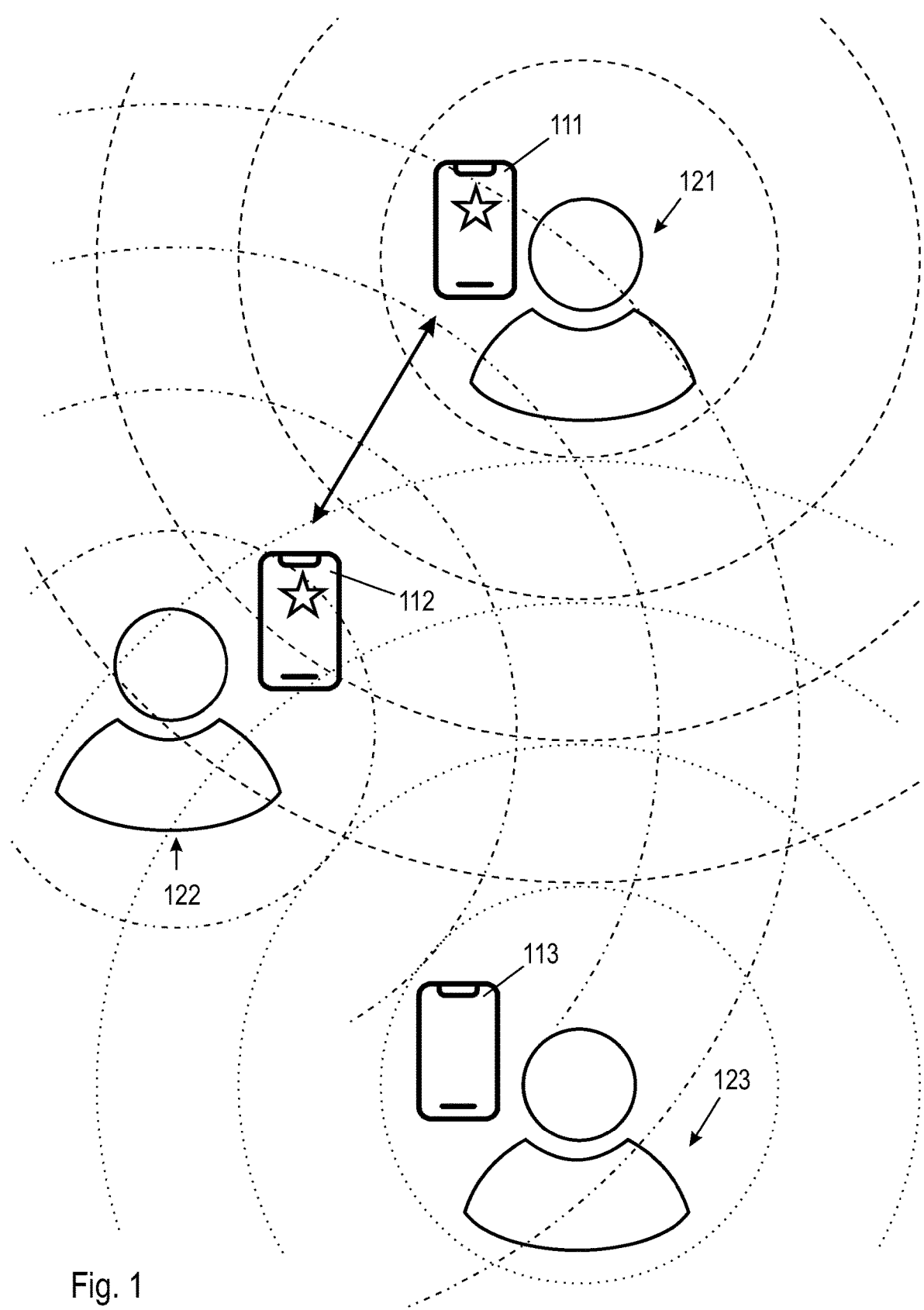
FIG. 1 shows a schematic representation of an embodiment of the method.

In the following, embodiments, as well as alternative embodiments and implementations, for the methods, devices and systems are described.

As used herein, the term "mobile device" refers to a device provided with a visual user interface which provides for interaction with a user of the mobile device. A typical example of a visual user interface is a touch screen which allows displaying information and receiving a user input by, for example, touching icons displayed on the touch screen. The mobile device additionally includes a digital memory configured to store software applications and data such as a local database. Exemplary mobile devices are mobile phones such as smartphones, personal digital assistants (PDA), tablet computers, wearing devices such as smart watches, digital bracelets, smart glasses and augmented reality devices, laptops, and notebooks. In specific embodiments, mobile devices are mobile phones such as smartphones, personal digital assistants (PDA), and wearing devices such as smart watches, digital bracelets, smart glasses, and augmented reality devices, which allow an immediate notification of the user while on the move.

In some embodiments, the method may be implemented as a software application running on a mobile device of a user. The software application may be a so-called "App" which is a software application a user may install on his or her mobile device or which is pre-installed. The software application may be a mobile device specific App provided by a site specific for the mobile device. Exemplary sites are the "App Store" provided by Apple Inc., the "Play Store" provided by Google LLC, or the "Microsoft Store" provided by Microsoft Corp. The user may easily download the software application from the respective site and install it on the mobile device before using it. The installed software application may be stored in the digital memory.

The mobile device may additionally include a processor which is in communication with the visual user interface, either directly or indirectly through a graphic processor, and the digital memory. In operation, the software application stored in the digital memory is executed by the processor to control operation of the mobile device, to cause the mobile device to provide the functionality as described herein.

According to an embodiment, a method for determining proximity between mobile devices of two or more users, such as a first user and a second user, is provided. The method may be embodied by a software application that each of the first user and the second user has installed on their mobile devices in advance. The software application, when executed on the mobile devices, controls the respective mobile device to provide the desired functionality as described further below such as sending short-range advertising broadcasts, receiving short-range advertising broadcasts sent by other mobile devices, checking internal databases for specific entries relating to other users, and notifying the user of the mobile device such as providing visual output, e.g. as a notification on the display, as haptic output, e.g. vibration of the mobile device, and/or as an acoustic output, e.g. an acoustic signal. The software application may provide additional functionality such as providing a user interface which allows the user to modify the settings of the software application, managing an internal database stored in the mobile device, communicating with a central database to upload and receive specific data to update the local database and the central database and/or to create new entries in the local database and the central database. The software application may control the mobile device to cause the mobile device to establish a communication of the mobile device with the central database after the software application has been installed for the first time, on a regular basis, and/or on request of the user.

The method may include several application processes. For example, the second mobile device may search for short-range advertising broadcasts sent by mobile devices of other users. The mobile devices of the other users may send short-range advertising broadcasts which the second mobile device may receive when the distance between the second mobile device and the mobile devices of the other users is within a transmission distance defined by the technology used for the short-range advertising broadcasts. When searching for the short-range advertising broadcasts, the second mobile device may only listen whether there are short-range advertising broadcasts sent by a mobile device of another user without actively querying the other mobile devices. The second mobile device may passively listen and does not actively query the other mobile devices to prompt the other mobile device for transmitting short-range advertising broadcasts.

The short-range advertising broadcasts may be unidirectional advertising broadcasts without establishing a connection between the mobile device, which sends the short-range advertising broadcasts, and the listening mobile device. Thus, a communication between the mobile devices is not established in response to the reception of the short-range advertising broadcasts. To discover nearby mobile devices, it is sufficient that the second mobile device listens for the short-range advertising broadcasts. An acknowledgment response and an active query are not needed to identify whether other mobile devices are in proximity to the second mobile device. Thus, according to an embodiment, the method as described herein uses a communication protocol without acknowledgment requirements for identifying nearby mobile devices. The short-range advertising broadcasts as used for proximity detection may be provided by a broadcast mode which provides a method for a mobile device to send connectionless data in advertising mode using non-connectable advertising events.

An example is Bluetooth Low Energy advertising broadcasts as, for example, described in the Bluetooth Core Specification, Revision v5.3, Revision Date 2021 Jul. 13 issued by the Bluetooth SIG. When sending short-range advertising broadcasts, the mobile devices may act like a Bluetooth Beacon which repeatedly, or periodically, sends a specific short-range unidirectional Bluetooth advertising broadcast.

A mobile device in the broadcast mode may send non-connectable and non-scannable advertising broadcasts anonymously by excluding the mobile device's address. Although the data encoded in the broadcast sent by a mobile device in the broadcast mode may be considered unreliable since there is no acknowledgment from the mobile device which receives the advertising broadcast, this possible unreliability does not pose a problem as the broadcast mode is only used for informing nearby mobile devices about the physical presence of the mobile device which sends the advertising broadcasts.

The mobile device which listens to receive the advertising broadcasts may be in an observation mode which includes passive scanning or active scanning to receive advertising broadcasts, and which is configured to receive connectionless data from a device that is sending advertising broadcasts without acknowledging the receipt of the advertising broadcasts.

The second mobile device may receive, among the short-range advertising broadcasts sent by the mobile devices of other users, at least a first short-range advertising broadcast which has been sent by the first mobile device. In a typical application scenario, there may be a plurality of mobile devices in close proximity to each other. The mobile devices may have turned on Bluetooth functionality such as the so-called discovery mode which allows a mobile device to scan nearby devices to query the service provided by these devices. Discoverable mode is a state within Bluetooth technology integrated devices that enables Bluetooth devices to search, connect and transfer data with each other. Discoverable mode is used to propagate the availability of a Bluetooth device and to establish a connection with another device. The disclosure as described herein employs the advertising mode instead of the discoverable mode for the proximity detection as this allows preservation of privacy as explained herein.

Advertising mode is different to discoverable mode or discovery mode as advertising mode provides for a connectionless unidirectional data transfer without establishing a connection or bidirectional data exchange. Using advertising mode instead of discovery mode has many benefits such as increased privacy and reduced energy consumption as discussed further below. Both, the first mobile device and the second mobile device may be at the same time in the advertising mode and the observation mode which is a specific Bluetooth Low Energy operational mode and may be referred to as "broadcast mode and observation procedure" in the above-mentioned Bluetooth Core Specification.

While the Bluetooth Low Energy "broadcast mode and observation procedure" is a preferred technology for detecting proximity between mobile devices, the disclosure is not limited thereto and may also include other technologies that provide similar functionality without sacrificing privacy and low power consumption.

For ease of simplicity only, the short-range advertising broadcasts are simply referred to as broadcasts. A first short-range advertising broadcast is referred to as first broadcast, a second short-range advertising broadcast is referred to as second broadcast, and so on.

The first broadcast encodes a universally unique identifier (UUID) and a first user identifier being unique for the first user of the first mobile device. The universally unique identifier is an identifier which is unique for the proximity service provided by the mobile device. The universally unique identifier may be hardware independent such that it is not related to a specific mobile device. Unlike other approaches, the MAC address of the mobile device is not encoded in the broadcasts and is thus not part of the universally unique identifier. This preserves privacy as the mobile device as such is not recognisable.

In the following, the universally unique identifier (UUID) used for identifying the proximity detection service is referred to hereinafter for simplicity as proximity UUID, while all other UUIDs are simply referred to UUID. The proximity UUID is used by all mobile devices which use the proximity detection method described herein to identify those mobile devices which provide the proximity detection method and to distinguish these mobile devices from other devices. The proximity UUID may be used to distinguish among the plurality of broadcasts received by the second mobile device those broadcasts which include the proximity UUID from other broadcasts which do not include the proximity UUID. Thus, the second mobile device may select the broadcasts which include the proximity UUID and disregard broadcasts which do not include the proximity UUID.

UUIDs including the proximity UUID may be 16-byte long identifiers. An example for the proximity UUID is 8021ecd2-4e30-11ec-81d3-0242ac130003. The proximity UUID is encoded in the first broadcast received by the second mobile device from the first mobile device to obtain the first user identifier and allows the second mobile device to distinguish the first broadcast from other broadcasts which do not have the proximity UUID. The broadcasts thus not only encode the proximity UUID but also the user identifier which can be embodied by the so-called Major and Minor 4 bytes of a broadcast.

The second mobile device may decode the first broadcast received from the first mobile device to obtain the proximity UUID and a first user identifier which is encoded, together with the proximity UUID, in the first broadcast. In a typical application scenario, the second mobile device may decode all broadcasts received by the second mobile device to check the UUID encoded in the respective broadcasts. The broadcast may be decoded completely so that all data contained in the received broadcasts is available. A broadcast may contain more data than only a UUID.

Once decoded, the second mobile device may select the data from those broadcasts which contain the proximity UUID while ignoring the data from broadcasts which do not contain the proximity UUID.

The decoded data which includes the proximity UUID also includes a user identifier which is, for the scenario that the first broadcast is from the first mobile device, the first user identifier. The first user identifier is an identifier unique for the first user with respect to the proximity detection service described herein. Each user is assigned a user specific user identifier to allow identification of the user and to distinguish between users which use the proximity detection service. A broadcast such as the first broadcast thus may include the proximity UUID and a user specific user identifier such as the first user identifier. The user identifier is also hardware independent so that the user identifier is not linked, for example, with the MAC address of the user's mobile device. This preserves privacy. Further, a user may also easily change the mobile device, for example when replacing an old mobile device with a new mobile device, as the user identifier is not dependent on and not linked with the actual hardware used.

The second mobile device may then check whether a pairing entry in a local database stored in the second mobile device exists for the first user identifier. The local database may be stored in the digital memory of the second mobile device. The local database may contain a plurality of pairing entries. A pairing entry includes at least a user identifier indicating that the user of the mobile device, in which the local database containing the pairing entry with the user identifier is stored, is paired with the user of that mobile device which has sent the broadcast encoding the user identifier. In the embodiment where the second mobile device receives the first broadcast encoding the first user identifier, the local database stored in the second mobile device contains a pairing entry for the first user of the first mobile device, i.e. the pairing entry in the local database stored in the second mobile device contains the first user identifier.

The second mobile device, more specifically the software application executed by the second mobile device, checks the local database and if the pairing entry exists, the second mobile device initiates a user notification process to notify the second user that the first user is located in proximity. Thus, the second user is notified when the first user is nearby.

The method as described herein is for notifying users which are acquainted with and know each other. This is different to other commonly known proximity detection methods where a contact between users which does not know each other is mediated through a central server. When referring to "acquainted with" or "know each other" it is meant that users have the contact details of the respective other users which uses the same proximity detection service as disclosed herein. The contact details allow establishing a communication between two users such as by the respective mobile phones. The communication which can be established with the contact details uses another communication technology than the proximity detection. For example, the communication may be, for example, a phone call, an exchange of text messages, a communication through an instant messaging service, or by email. The communication is typically mediated through a central service such as a server unlike the proximity detection where the mobile devices send and receive the broadcasts directly from each other.

Unlike other approaches, once one of the mobile devices has detected that another mobile device is nearby, a communication using the contact details is not automatically established. The proximity detection aims at notifying the users and not for automatically establishing a communication. It is left to the notified user whether she or he wishes to contact the other nearby user or whether she or he simply wants to ignore the notification.

The pairing entry in the local database of the second mobile device is thus associated with contact details stored for contacting the first user of the first mobile device. A local database is also stored in the first mobile device. The local database of the first mobile device also contains a pairing entry associated with contact details for contacting the second user of the second mobile device. Thus, both the first user and the second user have each other's contact details. The type of the contact details may be the same such as telephone numbers. The type of the contact details may also be different. For example, the first user may have stored in the first mobile device the telephone number of the second user while the second user may have stored in the second mobile device the email address of the first user.

According to an aspect of the present disclosure, the second mobile device not only receives the first broadcasts, which are sent by the first mobile device, but also sends second broadcasts which may be received by the first mobile device. The second broadcast also encodes the proximity UUID, i.e. universally unique identifier, as described herein and a second user identifier which is unique for the second user. The first mobile device contains a local database which includes a pairing entry for the second user. The first user may also be notified when the second user is in close physical proximity. Both users may be notified accordingly.

Thus, a pairing entry in a local database stored in the first mobile device may exist for a second user identifier unique for the second user of the second mobile device. The pairing entry may be associated with contact details stored in the first mobile device and to enable the first user to contact the second user. The first mobile device may search, in a similar manner as the second mobile device, for broadcasts sent by mobile devices of other users. The first mobile device may receive, among the broadcasts, at least a second broadcast sent by the second mobile device. Similar to the processes carried out by the second mobile device, the first mobile device decodes the second broadcast to obtain the second user identifier and then checks whether a pairing entry in the local database stored in the first mobile device exists for the second user identifier. If the pairing entry exists, the first mobile device initiates a user notification process to notify the first user that the second user is located in proximity.

The first and the second mobile devices may perform at the same time similar processes such as sending broadcasts, listening and receiving broadcasts sent by the respective other mobile device, decoding the received broadcasts to retrieve the user identifier encoded in the received broadcasts, comparing the decoded user identifier against the local database to check, whether there is a corresponding pairing entry, and notifying the respective user if a corresponding pairing entry has been found. A skilled person will appreciate that the method may be performed by a plurality of mobile devices to detect the presence of other devices of mutually known users.

Although the proximity detection service is intended to be provided for each user so that each of the users, such as the first and the second user who know each other, is notified when the respective other user is nearby, the quality and reliability of the transmission and reception of broadcasts may be different for different mobile devices. For example, while the first mobile device may still be able to receive the broadcasts of the second mobile device, the second mobile device may not be able to receive the broadcasts of the first mobile device as both mobile devices are from different manufacturers. The reliability of the proximity detection service reduces with increased distance between the mobile devices. The range in which the proximity detection is reliable may depend on several factors such as indoors vs. outdoor or the presence of disturbing signals from other devices.

However, the proximity detection using broadcasts may allow a detection of another mobile device up to about 400 m under good conditions. From a practical consideration, the detection range may be considered to be 300 m or 200 m. Even this range is of great practical value in many daily situations such as in crowded streets or during social events to get a notification if one or more contacts a user has are nearby.

An exemplary application of the method as described herein is described in connection with FIG. 1. A first user 121, a second user 122, and a third user 123 each have a mobile device such as a mobile phone which is referred to as first mobile device 111 of the first user 121, a second mobile device 112 of the second user 122, and a third mobile device 113 of the third user 123. Each mobile device 111, 112, 113 executes the method for determining proximity as described herein. The first user 121 and the second user 122 know each other. Also, the first user 121 and the third user 123 knows each other. However, the second user 122 and the third user 123 do not know each other. Thus, the local database of the first mobile device 111 contains pairing entries for each of the second user 122 and the third user 123, the local database of the second mobile device 112 contains a pairing entry for the first user 121 but not for the third user 123, and the local database of the third mobile 113 device contains a pairing entry for the first user 121 but not for the second user 122.

As illustrated in FIG. 1, each mobile device 111, 112, 113 transmits broadcasts as indicated by the concentric circles around the respective user 121, 122, 123. As explained further above, the first mobile device 111 transmits first broadcasts encoding the proximity UUID and the first user identifier, the second mobile device 112 transmits second broadcasts encoding the proximity UUID and the second user identifier, and the third mobile device 113 transmits third broadcasts encoding the proximity UUID and the third user identifier.

The first mobile device 111 and the second mobile device 112 are close enough to each other, for example about 50 m to 100 m far away from each other, so that each of the two mobile devices 111, 112 is able to receive the broadcasts sent by the respective other one of the two mobile devices 111, 112. As both of the first mobile device 111 and the second mobile device 112 include respective pairing entries for the user of the other mobile device, each of the first user 121 and the second user 122 is notified by the first mobile device 111 and the second mobile device 112, respectively, that the respective other user is close by. The mutual notification is indicated by a star on the display of the first mobile device 111 and the second mobile device 112. The notification signal may be any suitable signal as described further above, or a combination thereof.

On the other hand, the first mobile device 111 and the third mobile device 113 are too far away from each so that the broadcasts sent by the first mobile device 111 and the third mobile device 113 cannot be received by the respective other mobile device 111, 113 simply for the reason that the distance between the first mobile device 111 and the third mobile device 113 is too large. Consequently, neither the first user 121 nor the third user 123, which knows each other, are notified.

The second mobile device 112 and the third mobile device 113 are close enough so that the second mobile device 112 receives the third broadcasts sent by the third mobile device 113 and the third mobile device 113 receives the second broadcasts sent by the second mobile device 112. However, neither the local database of the second mobile device 112 has a pairing entry for the third user 123 nor the local database of the third mobile device 113 has a pairing entry for the second user 122. Therefore, when each of the second and third mobile devices 112, 113 checks the locally stored database whether a second or a third user identifier, respectively, is stored, both cannot find such a pairing entry. Consequently, neither the second user 122 nor the third user 123 is notified as both users are not acquainted with each other.

According to embodiments described herein, pairing entries are created when the respective users know each other which can be seen from the fact that they have each other's contact details. Only if two users have each other's contact details, a pairing entry is created and stored in the local database.

The method disclosed herein provides several advantages. For example, proximity detection is performed without the need of a communication network or a satellite navigation system. Communication networks or satellite navigation systems employ and require infrastructure, such as 3G, 4G or 5G mobile networks, WLAN or satellite network communications such as Starlink, or satellite navigation systems such as GPS, Glonass, Galileo or Beidou. Therefore, the proximity detection as disclosed herein remains available even when the mobile devices do not have a connection, or only a poor connection, to the communication network or the satellite navigation system.

The proximity detection is performed without detecting or publishing the user's location. Although the mobile devices send broadcasts, the actual location as, for example, available through a satellite navigation system is not revealed and transmitted.

Furthermore, as there is no central infrastructure needed, there is no central instance which could monitor or record the proximity detection performed by the respective mobile devices. Thus, the proximity detection as described herein remains private so that privacy is preserved.

Moreover, the proximity detection is performed between unpaired mobile devices and without pairing the mobile devices so that no additional information is transmitted. As the communication protocol for the broadcasts dispenses with acknowledgement responses, the transmitting mobile device is not even aware whether another mobile device has received the broadcasts sent by the transmitting mobile device as the receiving mobile device does not acknowledge the reception of the transmitted broadcast. A mutual control is therefore not included and avoided which further contributes to the preservation of privacy.

Although the broadcasts sent by the mobile device may also be received by other devices which are not registered for the proximity service disclosed herein, the data encoded in the broadcasts do not reveal information about the user. The data encoded in the broadcasts are basically the proximity UUID, which is hardware-independent and identical for all broadcasts sent by the mobile devices performing the proximity detection service, and the user identifier. The user identifier is only known to those mobile devices, the users of which know the user to which the user identifier is assigned. No contact details or other personal information are contained in the broadcasts. Thus, devices which may intercept the broadcasts cannot reveal the identity of the user, the mobile device of which has sent the broadcast. The only information which can be gained is that a user of a mobile device which uses the proximity detection service is nearby.

Using a broadcast, e.g. advertising broadcast, also reduces power consumption of the mobile devices as the sending mobile device only needs to send a broadcast once or twice every few seconds. The listening mobile device may listen for a time duration that is longer than the time period at which the sending device is repeatedly sending the broadcasts. For example, if the sending device such as the first mobile device sends a broadcast every 5 seconds, the listening device such as the second mobile device may listen and read all broadcasts every 45 seconds for about 15 seconds. The listening or reading time is thus longer than the period for sending the broadcast. This ensures that all broadcasts can be reliably received and checked, whether there is any broadcast encoding the proximity UUID.

For example, the mobile devices such as the first mobile device and/or the second mobile device and/or the third mobile device may periodically search for broadcasts of nearby mobile devices. Searching may be performed with a given duty cycle defined by a time for listening (listening mode with a given listening duration) and a time where the respective mobile device does not listen (idle mode with a given idle duration). The idle duration may be longer than the listening duration. During listening duration, the mobile devices may continuously listen and read all broadcasts which are received during the listening duration.

As used herein, a duration means a time span for an action. For example, the listening duration is the time span during which the mobile device continuously listens and reads. The idle duration is the time span during which the mobile device is idle. A time period is a time span between two events such as between sending broadcasts. A time period may indicate a repetition. For example, the listening duration and the idle duration are repeated alternately. The time span of the sum of the idle duration and the listening duration may be considered as observation period as during this time span each of listening and being idle are repeated once.

Furthermore, each of the mobile devices may periodically send a broadcast to enable other mobile devices to detect the presence of the mobile devices. The time period after which the mobile devices send a broadcast again (sending period), i.e. the time period between two broadcasts, may be shorter than the listening duration to ensure that during the listening duration of one mobile device at least one broadcast is sent by another mobile device. For increasing the detection reliability, the frequency at which broadcasts are sent may be raised so that, for example, the listening duration is at least twice or at least three times of the sending period.

According to an embodiment which can be combined with any other embodiment described herein, the listening duration may be at least twice as long as the sending period to enable the listening mobile device to receive at least two broadcasts during the listening duration. A listening mobile device may disregard a broadcast if during the listening duration only one broadcast is received. This prevents notification of a perhaps only transient encounter between two users such as while driving when one user passes by another user walking along the street. Such short-time encounters may rather distract users.

A mobile device (a sending mobile device) may continuously repeatedly send a broadcast after every sending period. A mobile device (a listening mobile device) may only listen during the listening duration while being inactive during the idle duration. Although the mobile devices may send repeatedly, sending a broadcast consumes little energy so that the battery of the mobile device is not heavily stressed. Also, the energy consumption during the observation period is reduced due to the idle duration.

In a typical scenario, the mobile devices repeatedly send broadcasts, i.e. are in a sending mode, as well as listen for broadcasts, i.e. are in observation mode.

For example, when a mobile device of a user executes the software application that is carrying out the method described herein, for example every 45 seconds the software application reads all broadcasts having the proximity UUID. Broadcasts which do not have the proximity UUID may be disregarded. Then for each broadcast having the proximity UUID in the local vicinity the Major and Minor 4 bytes are obtained. These 4 bytes may contain the user identifier of the user the mobile device of which has sent the broadcast. The software application then checks each user identifier against the local database stored in the user's mobile device to find any matches. If a match is found, then the software application creates a notification on the mobile device showing the other user who is nearby.

The values given above for the listening duration, idle duration and sending period are only exemplary and by no means limiting.

The local database stored in each of the mobile devices may be regularly updated to add new pairing entries. The update procedure may be initiated by the software application on a regular basis such as once a day, or on explicit request by the user of that mobile device. For example, the respective mobile device may establish a communication between the mobile device and a central database. The mobile device may then enquire whether a user entry for a specific user exists in a user table stored in the central database. For identifying a match, a check is made whether an entry for the user which runs the update procedure exists in a pairing table for the specific user stored in the central database. When an entry for the user exists in the pairing table for the specific user, a pairing entry is created in the local database stored in the mobile device.

The central database represents a central instance that is provided to coordinate and assist in finding matches between users which know each other and which have each other's contact details. The central database contains a user table which lists all users which have been registered with the proximity detection service. The way how the central database is organised is not of particular relevance. For example, the central database may be a single database hosted by a dedicated server. Alternatively, the central database may be a distributed database hosted by a plurality of dedicated servers. Moreover, the central database may be geographically or regionally structured such that sub-databases are provided for specific geographic regions to meet, for example, data protection requirements which can be different in different geographic regions. Providing separate databases for different geographic regions also improves accessibility and responsiveness of the databases. Thus, although the central database may be organised and structured according to various circumstances, the central database may be considered as a single logical database which is accessible for the respective mobile devices irrespective of their geographical location.

When referring to a server, a dedicated single server may be meant as well as a plurality of distributed servers. Similar as with the central database, the servers can be provided at geographical different places. From the perspective of the method as described herein, the server, or the plurality of servers, host a single logical database.

For illustration purposes, it is assumed that the second user has added a new contact to the contact list stored in the second mobile device, for example a new telephone number associated with the first user, and that the first user is already registered with the proximity detection service. Thus, both the first user as well as the second user may be registered with the system. This means that for both users exists a user entry in the user table stored in the central database. The user table may be considered as a general user table listing all users which have been registered with the proximity detection service.

When referring to a table, a simple database table may be meant. However, the way how the data are organised and stored in the central database or the respective local databases are of no relevance. A skilled person will appreciate that there are many ways to efficiently organise and structure databases. Thus, a table may be considered as a database structure in which the individual entries are organised in a retrievable manner, and which can be updated or supplemented with new entries. The term "table" is thus not limited to a table in the narrow sense but embraces all suitable database structures that allow storing the pairing entries with optional additional information. A "table" might be a single database structure or a set of database structures which are linked with each other.

Assume that the second user may receive the contact details of the first user, for example by exchanging business cards. After adding, for example by the second user, the contact details of the first user to the contact list stored in the second mobile device, the second mobile device communicates with the central database to find out whether the first user exists in the central database. This search is initiated or requested by the second mobile device. As the first user has already been registered with the proximity detection service, a user entry for the first user exists in the central database. This entry may be referred to as first user entry which contains the first user identifier for the first user and contact details of the first user, whose contact details are linked with the first user entry. As the second user is also registered with the proximity detection service, a user entry for the second user exists in the central database. This entry may be referred to as second user entry which contains the second user identifier for the second user and contact details of the second user, whose contact details are linked with the second user entry. Thus, for both the first user and the second user, respective user entries (first user entry and second user entry) exist in the user table of the central database.

Although both the first user and the second user are known to the proximity detection service, they are not yet paired or matched as long as both users are not acquainted with each other. As explained further above, acquainted with or known to each other means that the first user has the contact details of the second user and that the second user has the contact details of the first user. This mutual knowledge of the contact details is a precondition for creating pairing entries in the local databases of the first and second mobile devices. The verification, whether each user knows the contact details of the respective other user, is performed at the central database. To facilitate this verification, pairing table is provided for each user for which a user entry exists in the central database. The pairing table at the central database may be referred to as the central user pairing table to distinguish this table from local pairing tables stored in the mobile devices. Each user has its own central user pairing table stored in the central database.

For example, when a new user registers for the first time with the proximity detection service, a user entry is created as described above, and additionally a central user pairing table for this new user. Assume that the new user does not have any contact stored in the mobile device of the new user, the central user pairing table is empty. If, for example, the new user has one contact. i.e. contact details of another user, stored in the mobile device, a single pairing entry may be created in the central user pairing table for the other user provided that for the other user a user entry exists in the central database.

For preserving and maintaining privacy, an entry for a specific user in the central user pairing table of another user is only created when there is already a user entry for the specific user in the user table of the central database. Thus, if the new user has contact details of another user which has not registered with, and does not want to use the proximity detection service, the contact details of this other user will be disregarded and no entry in the central user pairing table created. In other words, when the mobile device of a given user checks all contacts such as the telephone numbers stored in the contact list of the mobile device whether there are user entries in the central database for each contact, an entry in the central user pairing table of that given user is only created for contacts which are already in the user table of the central database. If the mobile device does not find an entry for a given contact, this contact will simply be ignored. Thus, for a user who does not wish to be found by the proximity detection service and has therefore not registered with the proximity detection service, no entry in the central user pairing table for any registered user is created, even if that registered user has the contact details of the user who does not wish to be found by the proximity detection service.

With reference to FIGS. 2 to 10, an exemplary registering process for a new user as well as an updating process for existing users are described.

A first-time user may initially install the software application on the mobile device as described above. As this is a commonly known process, a detailed description is omitted.

Once installed, the user opens the software application at S201 which software application may be referred to as Proximity Detection App or simply as App. The App first checks at S203 whether the App had already been installed previously and used or opened for the first time. If the App has been installed for the first time (decision NO—App was not previously installed), the App notes that it has been opened for the first time. The user is then prompted at S205 by the App to provide personal details such as a name and contact details, and optionally a user photo and a status. In a typical application scenario, the telephone number of the user forms the contact details. Alternatively, or in addition to that the email address may also form the contact details.

Step S205 may also be entered by a user which had previously installed the App and has an account with the proximity detection service, but wants to update his or her personal details, for example to add a photo or to change the telephone number if, for example, the user has changed its telephone number. However, as the decision at S203 is Yes, the App opens at S227 the main page of the App where the user has the option to update his or her profile, for example by tapping on an icon indicating "Update Profile" as shown at S229. The App then continues with process S205 as described above.

Figure 3:
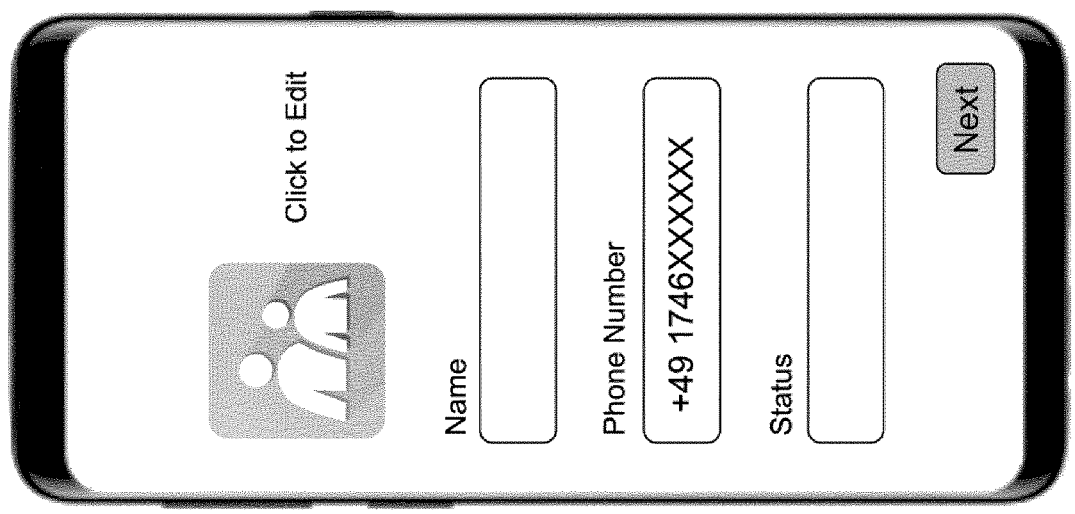

FIG. 3 illustrates an exemplary visual representation of process S205 as displayed on the display of the mobile device.

Once all required personal details are input by the user, or has been changed by the user, the user confirms these contact details by pressing, for example, a "Next" icon at S231 which transits the App to a new screen.

Figure 4:
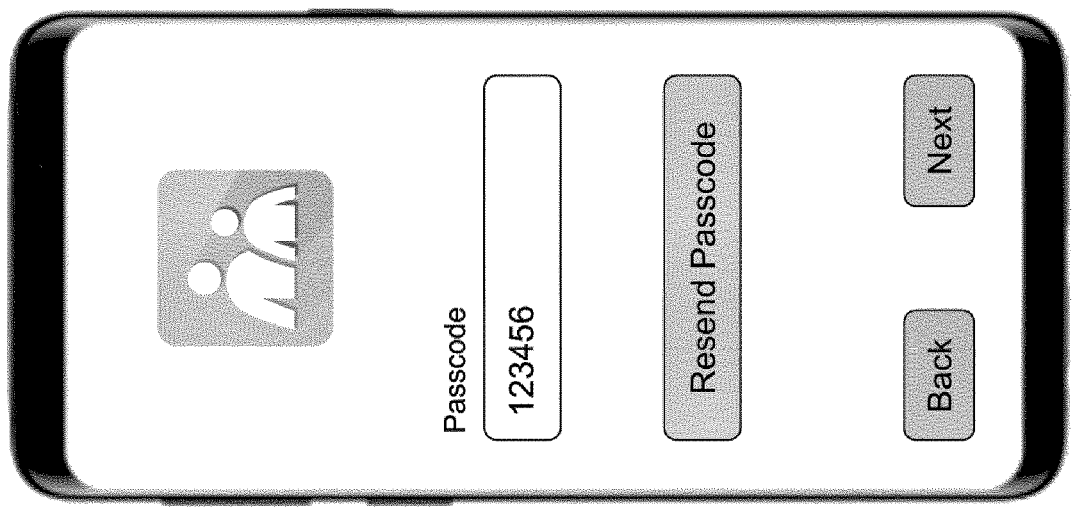
FIGS. 3 and 4 are exemplary visual representations of workflow screens on the display of the mobile device of a user for setting up the software application.

Depending on whether the user has opened the App for the first time, or has only edited personal details, a decision is made at S207. When the user has typed in a new telephone number, or has edited the telephone number, at process S205, a verification process starts at S209 to verify the new or edited telephone number. For the verification process, the App may send a request to the central database requesting to send a SMS passcode to the telephone number provided by the user. The user is prompted to type in the SMS passcode to verify the telephone number given is correct and to prevent another user from using the telephone number without authorisation. An exemplary visual representation of this verification process, as displayed on the display of the mobile phone, is shown in FIG. 4. Once the user receives the passcode via the SMS, he or she can press "Next" at S233 to continue.

If the verification process fails, for example because the user has typed a passcode which does not match what was sent, the App may return to process S209 to allow the user to correct the passcode. The user can have a new passcode sent with the "Resend Passcode" button not shown in FIG. 2. If the user is not receiving a SMS he or she can press the "Back" button at S235 to return to the previous screen allowing to re-enter the telephone number.

Once the telephone number has been verified, the App transits to process S211 and sets a user country code (Country variable) for the user based on the telephone number provided by the user.

If, on the other hand, the user has already an account with the proximity detection service but is, for example, setting up a new mobile device, the App then automatically checks the telephone number and selects the entries and details already contained in the central database. For this scenario, the verification process S207 may be dispensed with as indicated by the arrow for decision No of verification process S207. However, it would also be possible to use the verification process S207 to confirm that the correct telephone number is used for setting up the new mobile device and that no unauthorised use of the telephone number occurs. In any case, a pop-up window may be displayed to ask if the user wants to reuse the profile including all details already stored in the central database.

The App may use two variables which are permanent, Install and Country. The Install flag is to indicate to the APP that it is installed and will not need to perform an initial setup when opened. The Install flag may be checked in process S203. The Country variable may be the international dialling code (e.g. 49 for Germany) which is used when updating the databases.

Once the user has his or her telephone number verified, then the user is presented with the Standard App page (or main page of the App). An exemplary representation of the Standard App page is given in FIG. 10. If the user closes the App and re-opens the App at a later stage, then the user is also presented with the Standard App page that is normally displayed.

Figure 10:
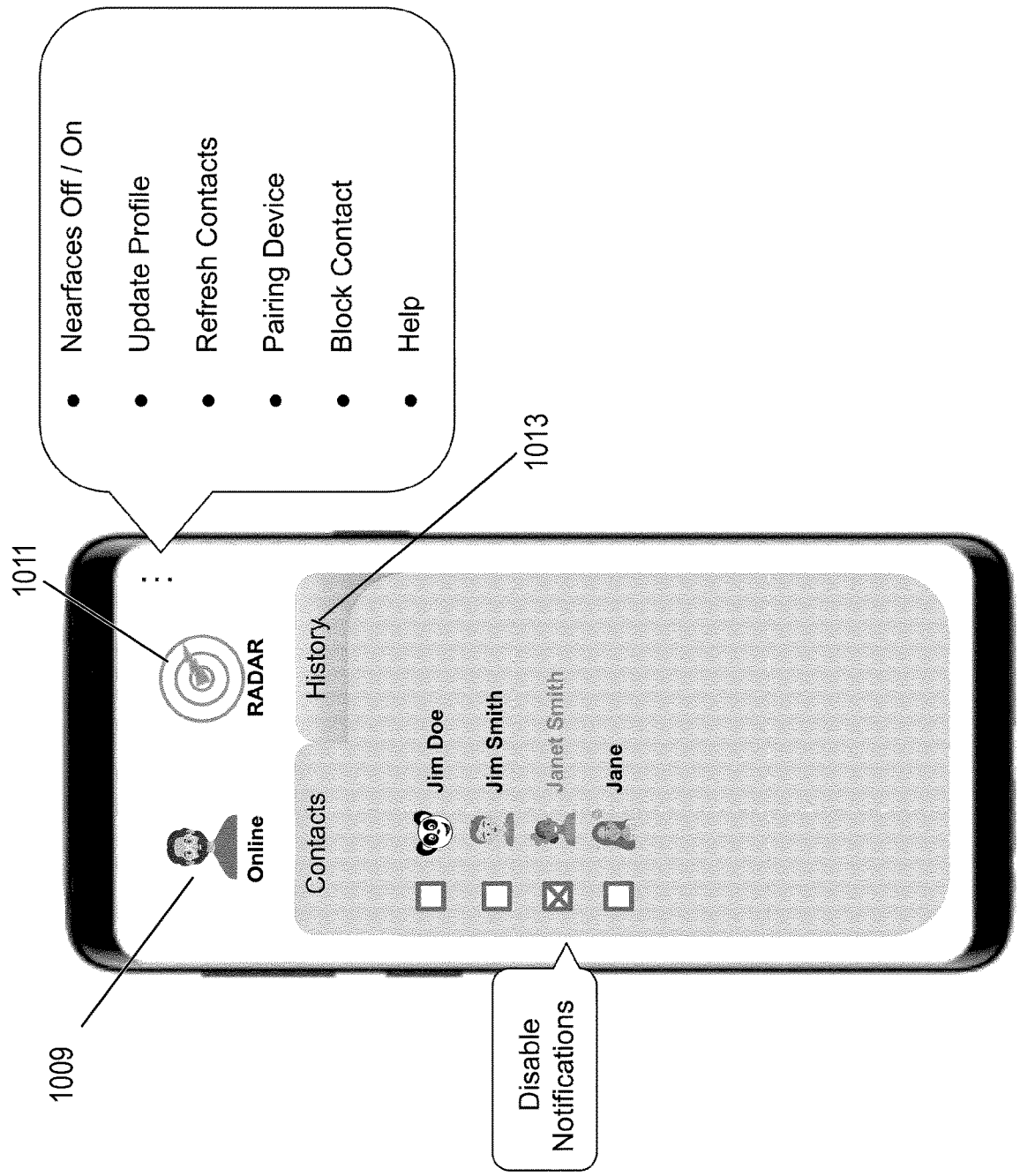
FIG. 10 is an exemplary visual representation of a screen on the display of the mobile device of the exemplary user for managing the local database and adapting the settings.

A user with an existing profile may update profile information starting from the Standard App page by tapping on a drop-down menu which is indicated by the 3 dots at the top right of the screen shown in FIG. 10.

At process S213, the App checks whether there is already a user entry in the central database for the telephone number or whether the App was already previously installed. In both cases, the user entry in the user table of the central database is updated with the newly provided data. For example, the user may have only changed the photo. In this case, the photo is uploaded into the central database.

The decision "Yes" in process S213 reflects two scenarios. One scenario is that an already registered user has changed his or her mobile device and is setting up a new phone. In this scenario, the telephone number of the user is already known to the system and a corresponding user entry in the user table of the central database exists. However, the user might have placed a new photo, name or status in their profile of the App installed in the new mobile device (or these data might be all the same). For ease and simplicity, an update may be performed without checking if there is actually a change in the personal data of the user. The other scenario is that an already registered user has changed the SIM-card, which has a new telephone number, of his mobile device. The App is already installed and used before the change of the SIM-Card. Thus, the user has edited the telephone number at S205 and the edited telephone number is uploaded to the central database to update the user entry in the user table.

If neither an entry in the user table for the telephone number exists nor the App the previously installed, the App transits to process S217 to create a new user entry in the user table of the central database. A representative example for the data stored in the user table of the central database is shown in FIG. 5. Each user is given a database identifier (Database ID) which will for consistency reasons also represents the user identifier used for the proximity detection. In addition to the database identifier the username, as provided by the user, and the telephone number are stored for each user. Thus, the contact details such as the telephone number and the name of the user are associated with the user identifier represented by the database identifier. The email address of the user may optionally be provided and saved and may also be used as contact details. The optional status is a personal description of the user which may or may not be provided by the user. The same is with the photo which is not needed but helpful when notifying that another user is nearby.

Once the new user entry has been created in the central database at process S217 or an existing user entry has been updated in process S215, the App continues to process S219 and sets the Installed flag to indicate that the installation process of the App and update of the personal details of the user is completed. The App then continues with process S400 which is referred to as Refresh State Machine and describes the processes to create or update the local databases.

Figure 2:
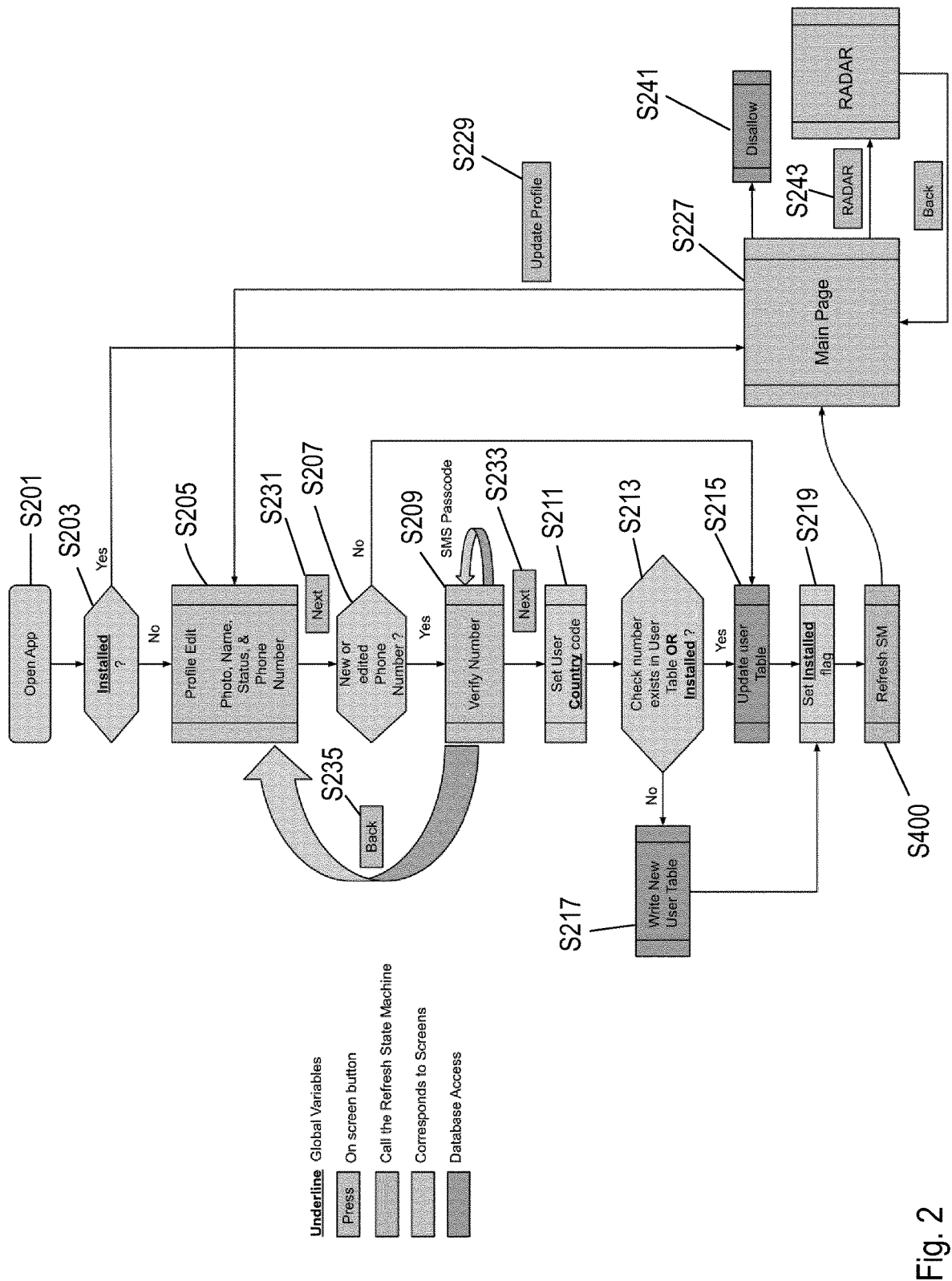
FIG. 2 shows a block diagram for illustrating a workflow for setting up a software application performing the method described herein on a user mobile device.

In the processes described in FIG. 2, the App executed by the mobile device updates or creates a user entry in the central database for the user who has started or installed the App. The personal information about this user such as his or her own telephone number as provided by the user is uploaded to the central database. The local database is not updated in these processes as this updating process is performed by the Refresh State Machine.

Figure 6:
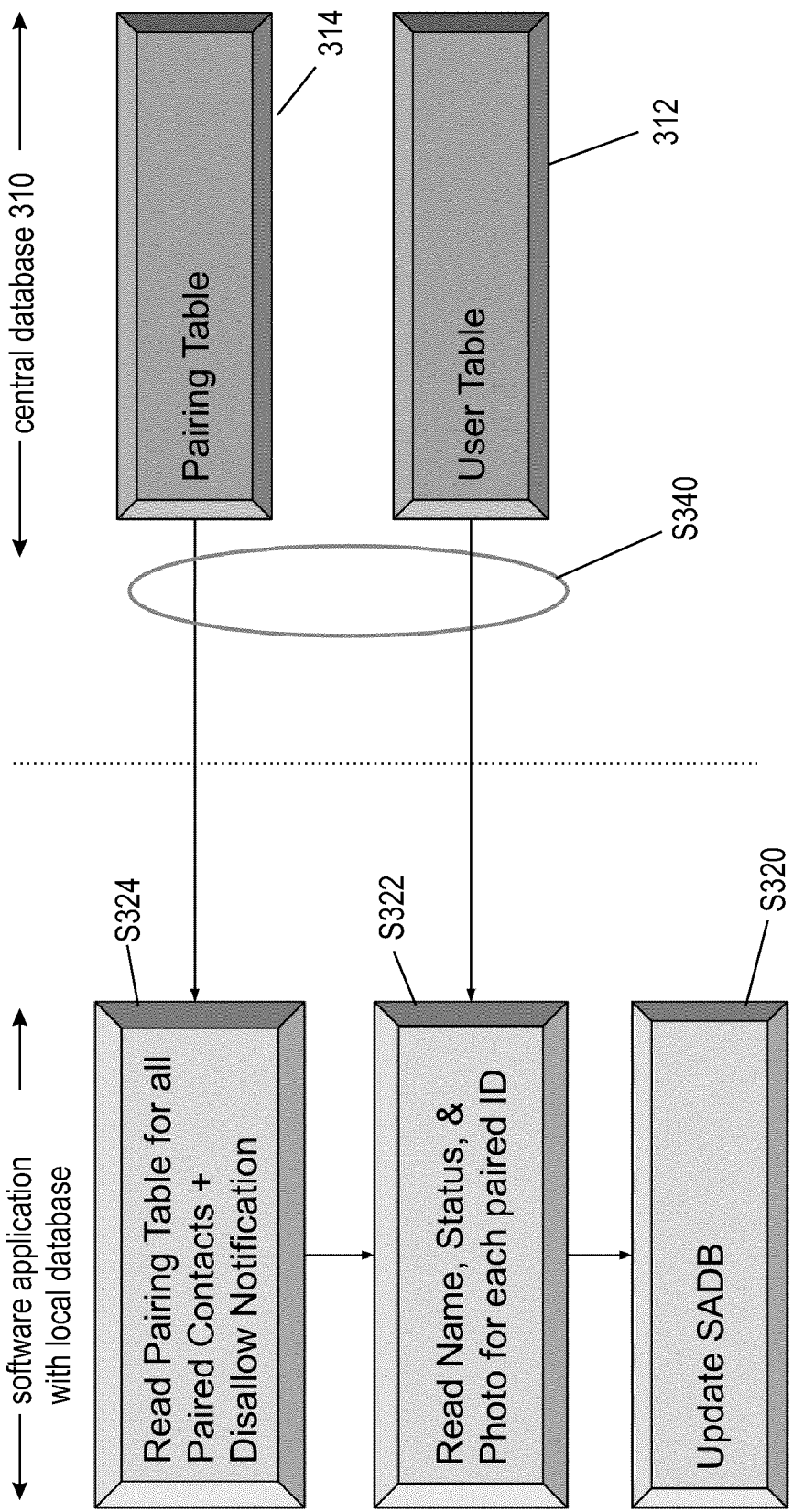
FIG. 6 shows a schematic representation of a local database stored in the mobile device and its relation to the central database.

Before describing the processes for creating and updating the local databases by the Refresh State Machine reference is made to FIG. 6 to describe the relation between the central database and the local database. As explained above, the central database 310 contains a (central) user table 312 containing the user entries for all users (telephone number, database ID, name and optional photo and status) and a pairing table 314 for each of the users listed in the user table 312. The pairing table 314 of each user is linked to the user table via each user's Database ID. The entries in the user table 312 of the central database 310 are created upon request of a mobile device which executes the software application (App) which carries out the processes of the method as described herein. This is illustrated in FIG. 2. When a user creates an account, by means of the software application executed by the mobile device, a new user entry is created in the user table 312. The main data contained in the user entry are the database identifier, corresponding to the user identifier, the contact details such as the telephone number of the email address, and the name of the user.

The software application executed by the mobile device at S322 does not only request creating a new entry in the user table 312 of the central database 310 for the new user but can also query the user table 312 to find users which are known to the querying user. If the querying user finds another user in the user table 312 which is known to the querying user, a pairing entry is created in the pairing table (central user pairing table) 314 of the querying user for the other user found in the user table 312. The central database 310 then checks whether there are mutual entries in the pairing tables (central user pairing tables) 314 of the respective users such as the querying user and the other user which indicates that the querying user has the contact details of the other user and also that the other user has the contact details of the querying user. If such mutual entries exist, the pairing entries in the respective pairing tables 314 are both marked as matched (matched pairing entries).

The matched pairing entry is then read by the software application, i.e. the App, executed by the mobile device at S324 and stored in the local database S320 as pairing entry or matched pairing entry. The software application may read all contact details locally stored in the mobile device once a day and if a new contact is found, initiates an update procedure.

The local database S320, which may also be referred to as Small App DataBase (SADB), is a database that is stored in the digital memory of the mobile device and under the control of the software application executed by the mobile phone. The local database S320 contains the matched pairing entries found by the Refresh State Machine process S400 as explained in detail further below. The matched pairing entries correspond to those contacts of the user of the mobile device who also use the same proximity detection service, i.e. users for which an entry in the user table 312 exists, and which have the contact details of the user of this mobile device. The local database may be encrypted to prevent other software applications from gaining access to the local database. This is also beneficial for privacy reasons.

The local database may be synchronised with the respective pairing table 314 once every 24-hours or when the user requests a refresh. As this synchronisation requires communication with the central database 310, synchronisation may be limited to periods where the mobile device is connected with the Internet through a high band-width connection such as WIFI.

Updating or in case of a freshly installed App for a new user creating of the local database first includes process S324 which reads all found paired contacts, i.e. all matched pairing entries in the user's pairing table stored in the central database. Then, the user details for each of the found matched contacts (matched pairing entries) are downloaded at S322. Finally, the local database is updated at S320 with the downloaded data. The processes shown in FIG. 6 basically correspond to process S414 shown in FIG. 7.

For security reasons, the communication between the mobile devices and the central database 310 may be encrypted as indicated at S340.

Without being limited, the central database 310 may be embodied using Google's Firebase.

Figure 7:
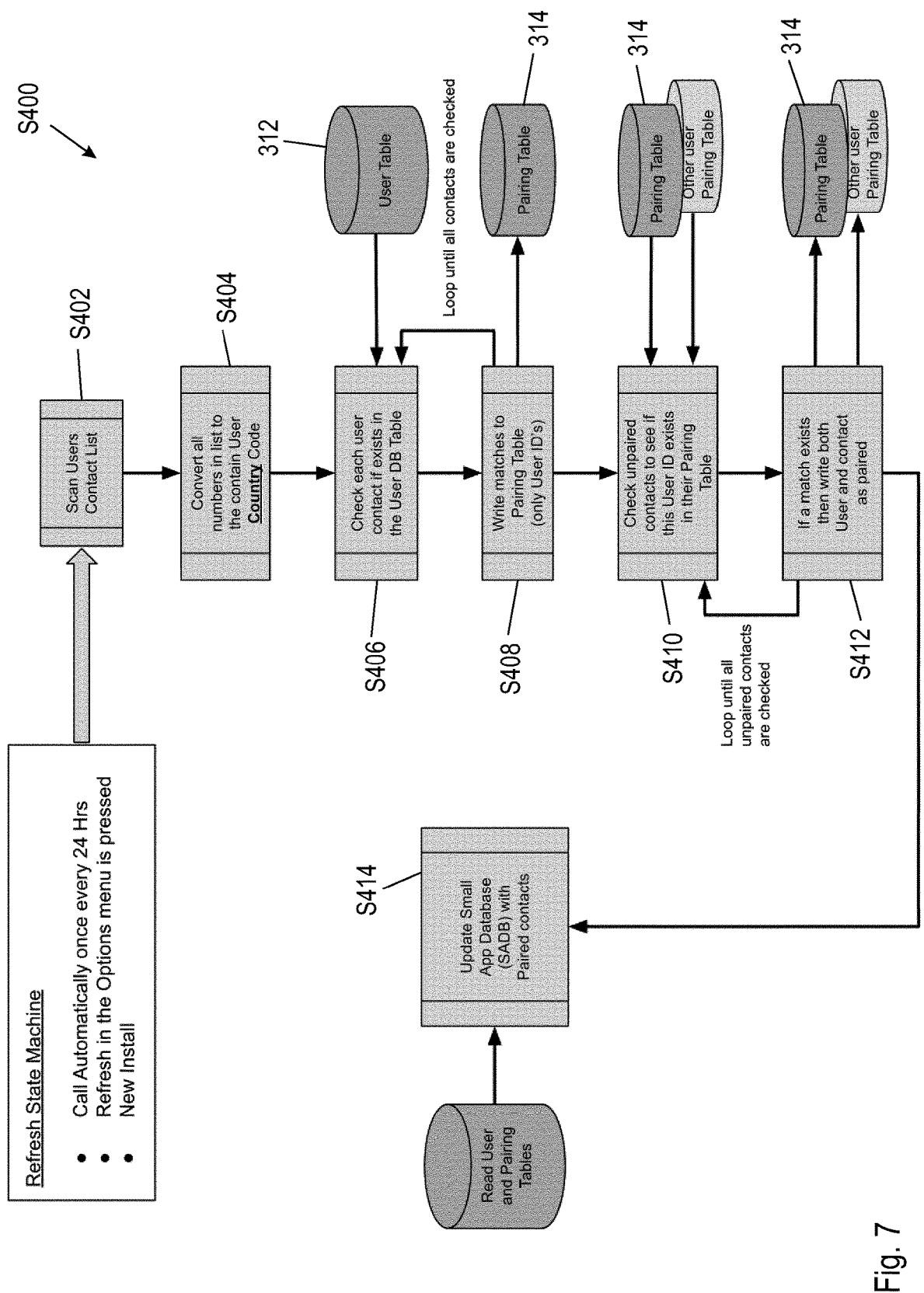
FIG. 7 shows a block diagram for illustrating a workflow for updating the central database and the local databases stored in the mobile devices of the users.

Details of the Refresh State Machine processes S400 are illustrated in FIG. 7. Processes S400 may be initiated automatically once every 24 hours, and upon explicit user request by touching a refresh icon in the option menu, or after the App has been installed for the first time.

At process S402, the software application executed by the mobile device scans for, or reads, all contacts of the user of the mobile device. Typically, each mobile device has a contact list containing all contact details such as telephone numbers of other users known to the user of the mobile device. Only for the sake of ease of explanation, reference is made to the first user having the first mobile device and the second user having the second mobile device. Thus, the software application executed by the first mobile device scans the contact list stored in the digital memory of the first mobile device.

As the first user may store the contact details in different formats such as with the leading "+" and the country code or without the country code, the telephone numbers may be converted at process S404 into a list of telephone numbers containing the user's Country code unless the telephone number already has a specific Country code. This conversion is only for bringing all telephone numbers into a single format.

At process S406, the first mobile device checks for each contact it has in its contact list whether a user entry exists in the user table 312 of the central database 310. This process S406 is repeated for all contacts found in process S402. If such a user entry exists in the user table 312, the such found contact is considered to be a potential match for a pairing entry.

The first mobile device then requests the central database 310 to add all newly found potential matches into the pairing table 314 of the first user stored in a central database 310. Alternatively, if a potential match has been found, the pairing table 314 of the first user is updated accordingly and then the first mobile device searches for the next match. This is indicated by the loop between S406 and S408.

An example of the pairing table 314 of the first user is shown in FIG. 8. The pairing table 314 contains the user identifiers, corresponding to the database identifiers mentioned in connection with the user table 312 as shown in FIG. 5. Initially, only the user identifier corresponding to the newly found potential match is added to the pairing table 314 of the first user. The attributes "Paired", "Disallowed" and "Block" are initially empty for a newly found potential match. An example for a newly found potential match is given for the user having the user identifier 32768.

An entry in the pairing table 314, which is not marked as "Paired", is not considered as a matched pairing entry but may be considered as a potential pairing entry. A potential pairing entry in the pairing table of the first user becomes a matched pairing entry, i.e. is marked as "Paired", when a corresponding potential pairing entry also exists for the first user in the pairing table of the user having a user identifier 32768. This is checked at process S410 which checks the so-called unpaired contacts, i.e. the potential pairing entries, of the first user against the pairing tables 314 of all users corresponding to the potential pairing entries.

For example, the first user has contact details of the second user so that a potential pairing entry for the second user is created in the pairing table 314 of the first user. Assume that a potential pairing entry for the first user is already contained in the pairing table 314 of the second user. At process S410, the database checks the pairing entries 314 of the second user whether there is an entry containing the user identifier of the first user. If such a hit is found, the entry corresponding to the second user in the pairing table of the first user is marked as "Paired" in process S412 as for example indicated for users with user ID 2, 3, 23, 8564, and 23456 shown in FIG. 8. A corresponding entry may be made for the entry corresponding to the first user in the pairing table of the second user. Thus, the first user and the second user are mutually paired.

Processes S410 and S412 continue until all unpaired contacts are checked.

Processes S410 and S412 may be carried out by the software application executed by the respective mobile devices separately for each pairing table of the respective user. Alternatively, the respective mobile device may request the central database to perform processes S410 and S412 and to report to the mobile device if there is any update in the pairing table 314 associated with the user of that respective mobile device. This reduces network traffic and may speed up the matching processes.

In the example for the pairing table 314 of the first user, which is stored in the central database 310, an unpaired entry exists for the user with the user identifier 32768. This means that the first user has the contact details of the user with the user identifier 32768, but that the user with a user identifier 32768 does not have the contact details of the first user. In this case the entry is not marked as Paired and the respective local databases of neither the first user nor the user corresponding to the user identifier 32768 are updated.

This is further illustrated with reference to FIG. 9 which shows the local database as stored in the first mobile device of the first user. The local database contains only the paired contacts (matched pairing entries) but not the not yet paired entries (potential pairing entries). For that reasons, no entry for the user with the user identifier 32768 exists in the local database of the first mobile device, and also no entry exists for the first user in the local database of the mobile device of the user with the user identifier 32768. This means that even when the first mobile device and the mobile device of the user with a user identifier 32768 are in close proximity to each other so that both mobile devices receive the broadcasts of the respective other device, the received broadcasts are ignored as there is no pairing entry in the local database of the respective mobile device. The method as disclosed herein thus prevents creation of pairing entries in the local database based only on the contacts stored in the mobile device of that user. It is needed that the other user also has the corresponding contact details. Only in this case it is assumed, that the users are acquainted with each other. This might be beneficial to stop stalkers getting ahold of someone's telephone number and using the proximity detection service to track them.

The process of updating the local database with the paired contacts (matched pairing entries) to create pairing entries in the local database is indicated at process S414. It should be noted that the local database only contains paired contacts. Potential pairing entries contained in the pairing table stored in the central database are not replicated in the local database. For that reason, entries in the local database are simply referred to as pairing entries. Updating the local database includes reading the updated pairing table 314 in the central database and adding new and updated entries in the local databases.

The potential pairing entries in the pairing tables of the respective users are used for cross checking whether paired users exist. For example, if a potential pairing entry for the first user is created in the pairing table of the second user, because the second user has recently added the contact details of the first user to the contact list stored in the second mobile device, it would not be possible to check whether a potential pairing entry for the second user already exists in the pairing table of the first user, unless the latter potential pairing entry would have been created in advance in response to a first user action to add the contact details of the second user to the contact list stored in the first mobile device. Thus, the potential pairing entry may be considered as a "memory" or "placeholder" to allow cross checking for the new user a mobile device of another user has uploaded.

The App executed by the mobile device thus checks all contacts stored in the contact list of the mobile device whether there is already a corresponding entry in the user's pairing table in the central database, or initiates creating a new entry in the user's pairing table if such an entry does not exist. Processes S406 and S408 exemplify this. Following this, the App checks for the "mutual" matching as described above, or requests the central database to check this. This includes checking each entry in the user's pairing table in the central database against the pairing table of the user corresponding to that entry, which is currently checked. As a result, the user's pairing table is updated when a match has been found as described above. Processes S410 and S412 exemplifies this.

The processes S410 and S412 may also lead to unmark a "Paired" entry in a user, i.e. to convert a matched pairing entry into a potential pairing entry. This may happen when the other user of the "Paired" entry has decided to discontinue using the proximity detection service and has unsubscribed from the service. In this case, that user also wishes not to be found by the proximity service. When unsubscribing, the user's pairing table is deleted or at least emptied. Thus, when cross checking in processes S410 and S412, another user, who has the contact details of the user who unsubscribed from the service, cannot find the "reverse" hit that is needed to mark a pairing entry as being "Paired." As a consequence, the previously existing pairing entry in the local database is removed. The entry in the user's pairing table in the central database remains but now as a potential pairing entry only, i.e. it is marked as "Paired." This entry remains for future purposes in case the user who has unsubscribed will use the service in future again.

With respect to FIGS. 5, 8 and 9 additional functionalities of the system as described herein is explained. FIG. 5 shows the user table stored in the central database 310. The user table includes all users registered with a proximity detection service. FIG. 8 shows a pairing table for the first user in this embodiment, whose pairing table is also stored in the central database 310. This pairing table includes all matched pairing entries indicated by being "Paired" and also potential pairing entries which are not indicated by being "Paired." "Unpaired" entries are not replicated in the local database stored in the first mobile device as illustrated in FIG. 9.

The pairing table in the central database 310 (shown in FIG. 8) includes the additional attributes "Disallow" and "Block." Both attributes can be set by the respective user.

The "Block" attribute is set by a user when he or she permanently wants to disable notification when the respective other user is nearby. When, for example, the first user, which has a user identifier 1 (user ID 1), wants to block the user with the user identifier 8564, the attribute "Block" is not only set in the pairing table of the first user but also in the pairing table of the user with the identifier 8564 for the entry corresponding to the first user. Similarly, if the user with a user identifier 8564 has set the attribute "Block" to block the first user, the pairing tables for both the first user as well as for the user with the user identifier 8564 are updated to mark that the respective other user is blocked.

A matched pairing entry of a blocked user is not replicated in the local database as will become apparent from comparing FIGS. 8 and 9. The local database stored in the first mobile device does not contain an entry for the user with a user identifier 8564. Thus, if only one user blocks another user, the respective pairing entries will be removed from the local databases of both mobile devices after the next refresh or update, which could be initiated by the user who wants to block the other user. With this functionality, a user is able to disable the proximity detection service provided by the mobile device of another user so that the other user is not informed when the user is nearby. This may be beneficial to block intrusive users or simply to allow the user to organise the notification functionality of its own contacts according to personal preferences.

The attribute "Disallow" is provided for another purpose. For example, when a user just wants to temporarily disable the proximity notification for a specific user, he or she can do so by setting the "Disallow" attribute. Disallowing a user only affects the local database stored in the mobile device of the user which has set the "Disallow" attribute. For that reason, a disallowed matched pairing entry remains in the local database. When comparing FIGS. 8 and 9, the matched pairing entry for the user with a user identifier 23 remains in the local database stored in the first mobile device.

An application example for using the "Disallow" attribute may be that family members does not want to be permanently notified about the presence of the other family members when all of them are at home. However, it might be beneficial to disable the "Disallow" attribute for a given time, if the family members want to meet at a crowded concert and just want to know when there nearby each other. Another application scenario might be that the kids want to be warned before the parents arrive home so that they can stop watching television and start with the homework.

The "Disallow" and "Blocked" attributes can be set by the user on the Standard App page or screen illustrated in FIG. 10. The main page lists all pairing entries stored in the local database. As the local database only includes matched pairing entries from the pairing table in the central database, all pairing entries in the local database are "real" paired entries.

Thus, each user has a pairing table in the central database, where the checks are made when both users have each other's telephone number in their contact lists. The attributes "Disallow" and "Block" can optionally be included in the user's pairing table.

The user who wishes to simply deactivate the proximity detection service for a given time can do so by simply tapping on his or her own photo 1009 shown in the Standard App page as illustrated in FIG. 10, or any selected icon, shown above left on the screen of the Standard App page. Simply tapping on the photo 1009 will place the user offline whereby none of his or her contacts will receive a notification, and also the user will receive no notifications. Tapping a second time will bring the user back online. In the offline mode, the mobile device does not send any broadcast so that other users cannot detect the presence of this user. Also, the mobile device does not listen to receive broadcasts from other mobile devices.

Disabling notification for a specific user can simply be done by tapping on the box next to the user for which the notification shall be temporarily disabled. When disabled, process S241 in FIG. 2 may update the user's pairing table in the central database as indicated in FIG. 8 the ticked box "Disallow" for user 23. The same is in the local database as illustrated in FIG. 9. Having an entry for the attribute "Disallow" in the central database facilitates handling for the user when the user changed its mobile device and makes the App more user friendly. When setting up a new mobile device, the users do not have to go through their contacts again setting things up.

The main menu can be entered by tapping on the 3 dots shown to the top right which will open a menu allowing the user to adapt further settings. For example, the user can set the proximity detection service OFF or ON, which is basically the same functionality as tapping on the photo. The user can also update its profile. This may open screens as shown in FIGS. 3 and 4 allowing editing of user entries including the telephone number. If the telephone number is changed, then the mobile device automatically enters the verification process with a new passcode. The main menu may also allow refreshing contacts, if the user has just added a new contact. In this case, the software application executed by the mobile device initiates a refresh to add this new contact (new user) to the local database.

Another entry in the main menu may bring up a help menu to assist the user when adapting the settings.

Figure 11:
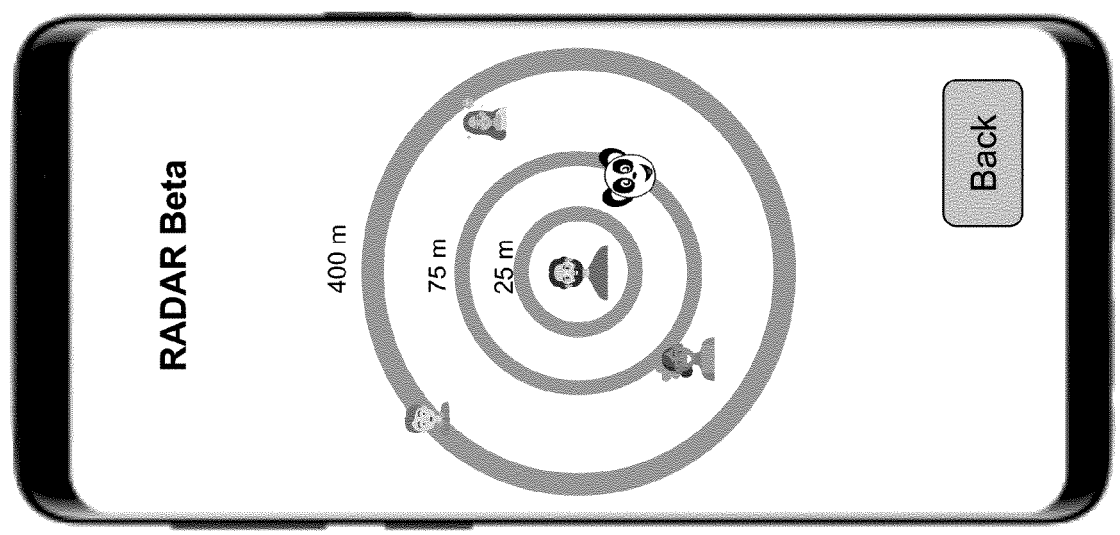
FIG. 11 is an exemplary visual representation of a screen on the display of the mobile device of the exemplary user indicating proximity to mobile devices of other users.

For notifying the user of other users which are nearby, the software application may open a so-called RADAR screen as shown in FIG. 11. This screen gives the approximate distance of other users identified by the proximity detection system relative to the user of the mobile phone, the picture of which is indicated in the centre. The approximate distance may be evaluated by assessing the signal strength of the received broadcasts.

The proximity detection services may always be executed in the background. It is not needed that the Standard App page is opened. Also, when working in the background, when a contact is nearby a notification is displayed. If the user presses on a notification, the Standard App page (main screen) pops up. This page lists each that is nearby and allows the user to get an approximate idea of how far away they are using the RADAR. Notifications on the "lock screen" of the mobile device can display the found name and profile picture if there is only one notification. If there are more than one hit, then a dedicated icon may be shown and the number of different hits in a single notification.

When a mobile device finds a hit with a matching known contact, the mobile device may ping every minute looking for hits. If the mobile device keeps finding the same other mobile device, a notification is not displayed unless there has been a 5 minutes gap, for example. If a user does not swipe away a hit, then for a new hit of the same found person, a new notification or notification activity entry is not generated.

The RADAR screen may automatically open when a user has been detected or upon tapping on the RADAR icon 1011 (at S243 in FIG. 2) shown in the top of the screen illustrated in FIG. 10.

The main section of the Standard App page shows who is currently in range of the user's mobile device. For frequent contacts (e.g. members of the same family) it can become annoying if the user is receiving many notifications per day. For this scenario there is a checkbox next to each contact allowing to "Disallow" a frequent contact to avoid generation of notifications. When this checkbox is set, the App will still work in the same way with the frequent contact, i.e. the contact is displayed in the current contacts list when nearby but no notifications will pop up. Setting "Disallow" does not affect, however, the functionality of the mobile device of the frequent contact (the other user) who was "Disallowed." The frequent contact (the other user) will be notified unless the other user has also "Disallowed" the user.

There is also a history tab 1013 which allows the user to see the time and date of when they received a notification from their contacts. The history may be limited to store only the recent days such as the last 30 days to keep the needed memory space low. An example of the stored history is shown in FIG. 12. The history is not uploaded to the central database and is only kept local under the control of the App. This is also beneficial for privacy reasons and to keep the network traffic low.

Figure 13:
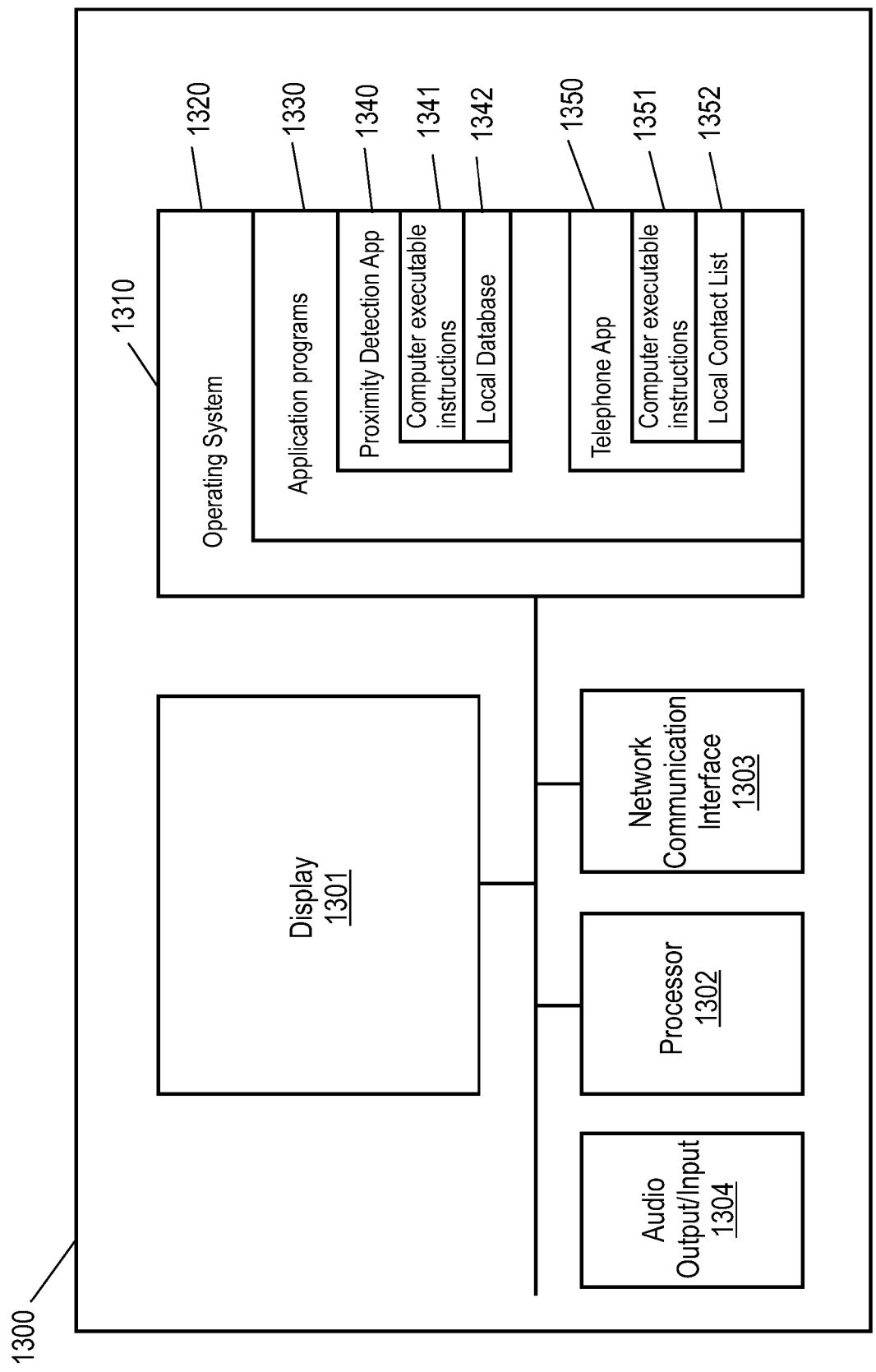
FIG. 13 is a schematic representation of a mobile device configured to perform the method as described herein.

A mobile device 1300, such as a mobile phone, which may be configured to perform the method as disclosed herein is illustrated in FIG. 13. The mobile device 1300 includes a display 1301 which may be a touch screen to allow both display of information as well as receiving a user input. The mobile device 1300 further includes a processor 1302, a network communication interface 1303 and an optional audio output/input 1304. The network communication interface 1303 represents all network communication capabilities of the mobile device 1300 and is for establishing communication with the central database and for sending and receiving broadcasts as described above. A skilled person will appreciate that different network communication functions may be provided by different devices such as different integrated devices. A so-called baseband chip may provide the communication with the telephone communication network such as 3G, 4G or 5G. For Bluetooth communication, a separate chip may be integrated in the mobile device 1300. Furthermore, WIFI communication may also use a separate chip. Other possible network communications may include nearfield communication.

The mobile device further includes a digital memory 1310 such as a non-volatile digital memory. The digital memory 1310 contains the operating system 1320 which provides the basic operation functionalities of the mobile device 1300 including control instructions to control and operate the display 1301, the audio output/input 1304, and the network communication interface 1303. The instructions of the operating system 1320 are loaded into the processor 1302 and executed to provide the desired functionality.

Application programs 1330 may also be stored in the digital memory, i.e. the application programs 1330 are installed in the mobile device 1300 so that the mobile device 1300 is configured to perform the respective program when loaded into, and executed by, the processor 1302. The respective application program 1330 then controls the mobile device to provide the desired functionality.

For example, the Proximity Detection App 1340, which is an embodiment of the method described herein, may be stored in the digital memory 1310. Proximity Detection App 1340 includes computer executable instructions 1341, which may represent the processes of the method described herein, and the local database 1342.

Another application program 1330 stored in the digital memory 1310 may be a telephone App 1350 which is used by the user to make phone calls. The telephone App 1350 may also include computer executable instructions 1351 and a local contact list 1352 where all contacts of the user are stored. For each contact, at least one telephone number may be stored in the local contact list 1352.

As described further above, the Proximity Detection App 1340, when executed by the processor 1302, may read all contacts stored in the local contact list 1352 to check whether user entries exist in the central database for each contact. If yes, the contact representing another user has also registered with the proximity detection service, and a potential pairing entry is added to the user's pairing table.

While specific language has been used to illustrate various embodiments for the methods, systems and computer program products disclosed herein, it is not intended to limit the present disclosure. Furthermore, the above embodiments can be freely combined unless stated otherwise.

The invention claimed is:

1. Method for determining proximity between a first mobile device of a first user and a second mobile device of a second user, comprising:
   searching, by the second mobile device, for short-range advertising broadcasts sent by mobile devices of other users;
   receiving, by the second mobile device, among the short-range advertising broadcasts at least a first short-range advertising broadcast sent by the first mobile device, the first short-range advertising broadcast encoding a universally unique identifier (UUID) and a first user identifier being unique for the first user of the first mobile device;
   decoding, by the second mobile device, the first short-range advertising broadcast received from the first mobile device to obtain the first user identifier;
   checking, by the second mobile device, whether a pairing entry in a local database stored in the second mobile device exists for the first user identifier, wherein a pairing entry in the local database of the second mobile device is an entry associated with contact details stored for contacting the first user of the first mobile device; and
   if the pairing entry exists, initiating, by the second mobile device, a user notification process to notify, by the second mobile device, the second user that the first user is located in proximity.

2. Method according to claim 1, wherein the second mobile device periodically searches for the short-range advertising broadcasts.

3. Method according to claim 1, further comprising broadcasting, by the second mobile device, second short-range advertising broadcasts encoding the universally unique identifier (UUID) and a second user identifier being unique for the second user of the second mobile device.

4. Method according to claim 3, wherein the second mobile device broadcasts the second short-range advertising broadcast repeatedly after every sending period, which is the time period between two broadcasts.

5. Method according to claim 4, wherein the second mobile device repeatedly enters a listening mode having a given listening duration during which the second mobile device continuously searches for the short-range advertising broadcasts, wherein the listening duration is longer than the sending period.

6. Method according to claim 3, wherein a pairing entry in a local database stored in the first mobile device exists for a second user identifier unique for the second user of the second mobile device, wherein a pairing entry in the local database of the first mobile device is an entry associated with contact details stored for contacting the second user of the second mobile device, wherein the method further comprises
- searching, by the first mobile device, for short-range advertising broadcasts sent by mobile devices of other users;
- receiving, by the first mobile device, among the short-range advertising broadcasts at least the second short-range advertising broadcast sent by the second mobile device;
- decoding, by the first mobile device, the second short-range advertising broadcast to obtain the second user identifier;
- checking, by the first mobile device, whether a pairing entry in the local database stored in the first mobile device exists for the second user identifier, and
- if the pairing entry exists, initiating, by the first mobile device, a user notification process to notify, by the first mobile device, the first user that the second user is located in proximity.

7. Method according to claim 1, wherein the short-range advertising broadcasts are unidirectional advertising broadcasts, particularly unidirectional Bluetooth advertising packets.

8. Method according to claim 1, further comprising:
- receiving, by the second mobile device, among the short-range advertising broadcasts a third short-range advertising broadcast sent by a third mobile device, the third short-range advertising broadcast encoding the universally unique identifier (UUID) and a third user identifier being unique for a third user of the third mobile device;
- decoding, by the second mobile device, the third short-range advertising broadcast to obtain the third user identifier;
- checking, by the second mobile device, whether a pairing entry in a local database stored in the second mobile device exists for the third user identifier, and
- if the pairing entry does not exist, disregarding the third short-range advertising broadcast by the second mobile device without notifying the second user.

9. Method according to claim 1, further comprising:
- establishing a communication between the second mobile device and a central database;
- enquiring, by the second mobile device, whether a user entry for the first user exists in a user table stored in the central database;
- checking, whether an entry for the second user exists in a pairing table of the first user stored in the central database; and
- when an entry for the second user exists in the pairing table of the first user, creating the pairing entry in the local database stored in the second mobile device for the first user identifier.

10. Method according to claim 1, wherein decoding the first short-range advertising broadcast includes obtaining the universally unique identifier (UUID), wherein the first short-range advertising broadcast is disregarded if the universally unique identifier (UUID) does not correspond to a pre-defined universally unique identifier stored in the second mobile device.

11. Method according to claim 1, wherein a software application is executed on each of the first mobile device and the second mobile device, wherein the respective application executed on the first mobile device and the second mobile device controls each of the first mobile device and the second mobile device to broadcast short-range advertising broadcasts and to search for short-range advertising broadcasts, particularly without requiring user interaction.

12. Method according to claim 1, wherein an existing pairing entry for the first user in the local database stored in the second mobile device is removed from the local database stored in the second mobile device when the first user marks the second user, using the first mobile device, as being blocked.

13. Method according to claim 1, further comprising
updating the local database stored in the second mobile device by establishing a communication with a remoted central database, wherein updating includes enquiring, by the second mobile device, whether pairing entries have been added to a pairing table of the second user stored in the central database, and if yes, updating the local database.

14. Computer program product comprising instructions which, when the program is executed by a computer, cause the computer to carry out the method of claim 1.

15. A mobile device comprising:
a display, a network communication interface, a digital memory, and a processor configured to perform the method of claim 1.

* * * * *